(12) United States Patent

Jain et al.

(10) Patent No.: US 10,133,574 B2
(45) Date of Patent: Nov. 20, 2018

(54) POWER MANAGEMENT OF INSTRUCTION PROCESSORS IN A SYSTEM-ON-A-CHIP

(71) Applicant: Advanced Micro Devices, Inc., Sunnyvale, CA (US)

(72) Inventors: Akanksha Jain, Austin, TX (US); Wei Huang, Austin, TX (US); Indrani Paul, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 7 days.

(21) Appl. No.: 15/181,837

(22) Filed: Jun. 14, 2016

(65) Prior Publication Data

US 2017/0357509 A1 Dec. 14, 2017

(51) Int. Cl.
*G06F 9/30* (2018.01)
*G06F 1/32* (2006.01)

(52) U.S. Cl.
CPC ........ *G06F 9/30181* (2013.01); *G06F 1/3228* (2013.01); *G06F 1/3296* (2013.01)

(58) Field of Classification Search
CPC . G06F 9/3867; G06F 2212/452; G06F 9/3001
See application file for complete search history.

(56) References Cited

U.S. PATENT DOCUMENTS

| 9,613,393 | B2 * | 4/2017 | Dorsey | G06F 1/324 |
| 2010/0275207 | A1 * | 10/2010 | Radmilac | G06F 11/3466 718/101 |
| 2011/0022833 | A1 * | 1/2011 | Nussbaum | G06F 1/324 713/100 |
| 2014/0215241 | A1 * | 7/2014 | Yoon | G06F 1/324 713/322 |

OTHER PUBLICATIONS

Jackson, James R., "Networks of Waiting Lines," University of California, Los Angeles, California, Feb. 22, 1957, pp. 518-521.
Paul, Indrani, et al., "Cooperative Boosting: Needy Versus Greedy Power Management," IEEE/ACM International Symposium on Computer Architecture (ISCA '13), Jun. 2013, Tel Aviv, Isreal, pp. 1-12.
Paul, Indrani, et al., "Coordinated Energy Management in Heterogeneous Processors," IEEE/ACM International Symposium on Computer Architecture (ISCA '13), Nov. 17-21, 2013, Denver, CO, pp. 1-12.
Su, Bo, et al., "Implementing a Leading Loads Performance Predictor on Commodity Processors," Proceedings of USENIX ATC '14: 2014 USENIX Annual Technical Conference, Jun. 19-20, 2014, https://www.usenix.org/conference/atc14/technical-sessions/presentation/su, 7 pages.

(Continued)

*Primary Examiner* — Austin Hicks
*Assistant Examiner* — Alyaa T Mazyad (57) ABSTRACT

A system-on-a-chip includes a plurality of instruction processors and a hardware block such as a system management unit. The hardware block accesses values of performance counters associated with the plurality of instruction processors and modifies one or more operating points of one or more of the plurality of instruction processors based on comparisons of the instruction arrival rates and the instruction service rates to achieve optimized system metrics.

20 Claims, 5 Drawing Sheets

(56) References Cited

OTHER PUBLICATIONS

Miftakhutdinov, Rustam, et al., "Predicting Performance Impact of DVFS for Realistic Memory Systems," Proceeding of MICRO-45 Proceedings of the 2012 45th Annual IEEE/ACM International Symposium on Microarchitecture, IEEE Computer Society, Washington DC, 2012, 11 pages.

McLaughlin, Adam, et al., "A Power Characterization and Management of GPU Graph Traversal," Workshop on Architectures and Systems for Big Data, Jun. 15, 2014, Minneapolis, Minnesota, 6 pages.

Wikipedia, "Queueing Theory," <http://www.en.wikipedia.org/wiki/Queueing_theory.com>, Accessed Jun. 24, 2016, 7 pages.

* cited by examiner

POWER MANAGEMENT OF INSTRUCTION PROCESSORS IN A SYSTEM-ON-A-CHIP

BACKGROUND

Field of the Disclosure

The present disclosure relates generally to processing systems and, more particularly, a processing system that is implemented as a system-on-a-chip.

Description of the Related Art

A system-on-a-chip (SOC) implements multiple instruction processors including central processing units (CPUs), graphics processing units (GPUs), and other application-specific integrated circuits (ASICs) such as multimedia blocks, video encoding devices, and the like. The processing speeds of the instruction processors are determined by their respective operating points, which are controlled by varying the operating voltage, frequency, available memory bandwidth, or other operating characteristics of the instruction processor. For example, increasing the operating voltage of a CPU increases its operating frequency, which allows the CPU to process more instructions per second.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The instruction processors on a system-on-a-chip (SOC) interact with each other by exchanging requests over interfaces between the different instruction processors. For example, a CPU may execute a first instruction to determine a new position of an object in a scene and then transmit a request to have a GPU render the object at the new position. The GPU renders the object as requested and then transmits a request to a video encoding device to display the rendered object on a screen at the position requested by the CPU. Differences between the processing speeds of the interacting instruction processors on the SOC may lead to non-optimal performance or inefficiencies in power allocated to the instruction processors by conventional power management algorithms. For example, if the CPU generates requests that are sent to the GPU faster than the GPU can process the requests, the requests become backlogged in memory until the GPU is able to fetch the requests for execution. Although the GPU may eventually process all of the requests, power is wasted by running the CPU at a higher operating point than is necessary to maintain a steady-state flow of requests from the CPU to the GPU.

Power can be efficiently allocated to instruction processors implemented on an SOC by setting operating points of the instruction processors based on a model that represents the instruction processors as corresponding queues in a queuing network that defines interconnections between the queues. The model determines operating metrics of the instruction processors based on values of performance counters (or other hardware circuitry that is observable by hardware or software such as hardware performance counters) implemented in the instruction processors. The operating metrics may include an instruction service rate, a power efficiency, and the like. The parameters that define the model for each of the instruction processors may be determined by executing a suite of known typical applications on the instruction processors prior to runtime. In some embodiments, the operating points of the instruction processors are determined by accessing values of the counters in the instruction processors, determining service rates for the instruction processors based on the model and the counter values, comparing the service rates of the instruction processors that are interconnected by the queuing network, and adjusting the operating points based on the comparison to achieve a global metric and a steady-state of the queues of the queuing network. Global metrics may include overall system utilization, throughput of the system, throughput of one or more of the instruction processors, instructions per watt of power consumed, a total die power, and the like. The operating points may be modified in response to detecting a phase change for applications executing on the SOC during runtime, e.g., based on detected changes in the values of the counters in the instruction processors.

Figure 1:
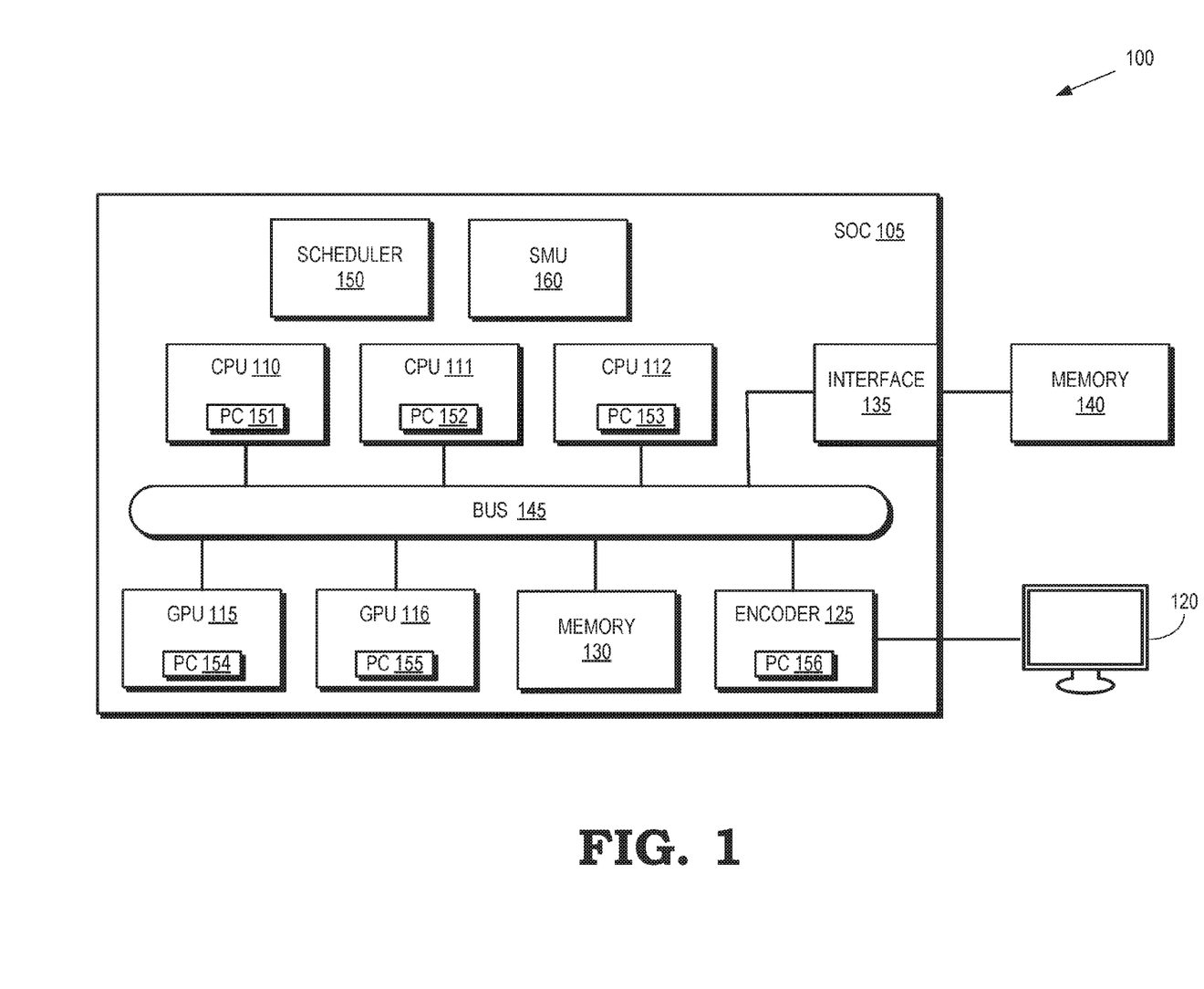
FIG. 1 is a block diagram of a processing system that includes a system-on-a-chip (SOC) according to some embodiments.

FIG. 1 is a block diagram of a processing system 100 that includes a system-on-a-chip (SOC) 105 according to some embodiments. The SOC 105 is a single chip, wafer, or die that implements multiple instruction processors, as well as other circuitry such as wires, lines, or traces that interconnect the instruction processors. As used herein, the term "instruction processor" refers to an entity on the SOC 105 that processes instructions. Instruction processors may therefore include central processing units (CPUs), graphics processing units (GPUs), field programmable gate arrays (FPGAs), application-specific integrated circuits (ASICs), individual processor cores or compute units implemented within these entities, and the like. The SOC 105 includes multiple CPUs 110, 111, 112 (collectively referred to herein as "the CPUs 110-112") that can independently execute instructions concurrently or in parallel. Some embodiments of the CPUs 110-112 implement multiple processor cores that may also independently execute instructions concurrently or in parallel. Although three CPUs 110-112 are shown in FIG. 1, other embodiments of the SOC 105 may include more or fewer CPUs.

The SOC 105 also includes one or more GPUs 115, 116 for creating visual images intended for output to a display 120, e.g., by rendering images based on a model of a scene that may be generated by the CPUs 110-112. Some embodiments of the GPUs 115, 116 may include multiple cores, a video frame buffer, or cache elements that are not shown in FIG. 1 in interest of clarity. The GPUs 115, 116 may be configured to process multiple instructions in parallel. For example, the GPUs 115, 116 may be configured as single instruction, multiple data (SAID) instruction processors for concurrently executing the same instruction on different datasets. Although two GPUs 115, 116 are shown in FIG. 1, other embodiments of the SOC 105 may include more or fewer GPUs.

The SOC 105 may also implement other instruction processors such as an application-specific integrated circuit (ASIC) that is configured as an encoder 125. For example, the encoder 125 may be a video encoder that encodes the information representative of an image rendered by one of the GPUs 115, 116 into encoded data that can be transmitted to the display 120, which may decode the data and use the decoded data to generate images for presentation on the display 120. Other ASICs (not shown in FIG. 1), such as multimedia blocks, may be configured to perform other functions.

The processing system 100 includes internal and external memories. Some embodiments of the SOC 105 implement internal memory 130 that can be accessed by the CPUs 110-112, the GPUs 115, 116, the encoder 125, or other entities implemented on the SOC 105. The internal memory 130 may be used to store instructions for execution by the CPUs 110-112 the GPUs 115, 116, or the encoder 125, data to be used by the instructions, or the results generated by executing the instructions. Some embodiments of the SOC 105 implement an interface 135 such as a memory physical layer (PHY) interface to an external memory 140. For example, the interface 135 may provide an interface to an external memory 140 that is implemented as dynamic random access memory (DRAM) such as double data rate (DDR) DRAM.

A bus 145 is implemented on the SOC 105 to interconnect and facilitate communication between the CPUs 110-112, the GPUs 115, 116, the encoder 125, the memory 130, the memory PHY 135, and other entities on the SOC 105 that may be connected to the bus 145. Instructions may therefore be transmitted from one instruction processor to another. For example, the CPU 110 may execute a first instruction to determine a new position of an object in a scene and then transmit a request to the GPU 115 over the bus 145. The request may include an instruction that is executed by the GPU 115 to render the object at the new position. The GPU 115 may render the object as indicated by the instruction and then transmit a request over the bus 145 that includes an instruction that is executed by the encoder 125 to encode the data representative of the rendered image for transmission to the display 120. The encoder 125 may encode the data and transmit the encoded data to the display 120.

An instruction scheduler 150 is used to schedule instructions for execution by the instruction processors on the SOC 105 such as the CPUs 110-112 or the GPUs 115, 116. Some embodiments of the instruction scheduler 150 are out-of-order instruction schedulers that are configured to dispatch instructions for processing by the instruction processors in an order that is different than the program order of the instructions. The instruction scheduler 150 may therefore be configured to account for data dependencies between instructions.

Sets of performance counters (PCs) 151, 152, 153, 154, 155, 156 (collectively referred to herein as "the performance counters 151-156") are used to collect information indicative of states of the entities on the SOC 105. In some embodiments, the performance counters 151-156 are counters that are implemented in hardware as sets of special-purpose registers in the corresponding instruction processors such as the CPUs 110-112, the GPUs 115, 116, and the encoder 125. However, the performance counters 151-156 may be implemented using other hardware circuits that are observable to hardware or software in the processing system 100. Values of the set of performance counters 151 implemented in the CPU 110 may be incremented in response to events that occur in the CPU 110 such as instruction retirements, cache misses, branch mispredictions, and the like. In some embodiments, values of the performance counters 151-156 (or subsets thereof) are indicative of instruction arrival rates at the instruction processors and instruction service rates at the instruction processors. As used herein, the phrase "service rate" indicates the rate at which an instruction processor completes the tasks associated with instructions that are received by the instruction processor. For example, the instruction service rate of an instruction processor may be equal to a number of instructions that are retired in a particular time interval.

Some embodiments of the SOC 105 implement one or more hardware blocks such as a system management unit (SMU) 160 to carry out policies set by an operating system (not shown in FIG. 1) used by the SOC 105. The operating system may be implemented using one or more of the CPUs 110-112. Some embodiments of the SMU 160 may be used to manage thermal and power conditions in the processing system 100 according to policies set by the operating system. The SMU 160 may therefore be able to control a performance state of the processing system 100. Some embodiments of the SMU 160 control the performance state by controlling power supplied to instruction processors on the SOC 105, as well as adjusting operating points of the instruction processors, e.g., by changing an operating frequency or an operating voltage supplied to the instruction processors. The SMU 160 is configured to access information indicating the values of the performance counters 151-156 and use the values of the performance counters 151-156 to estimate instruction arrival rates and instruction service rates for instruction processors including the CPUs 110-112, the GPUs 115, 116, and the encoder 125. The SMU 160 may then modify operating points of one or more of the instruction processors based on comparisons of the instruction arrival rates and the instruction service rates at each of the instruction processors. The SIM 160 may choose the operating points to achieve steady-state processing of instructions by the instruction processors. The SMU 160 may also choose the operating points based on a global metric such as overall utilization of the SOC 105, throughput of the SOC 105, throughput of the instruction processors, instructions per watt of power consumed by the SOC 105, and a total die power of the SOC 105.

Figure 2:
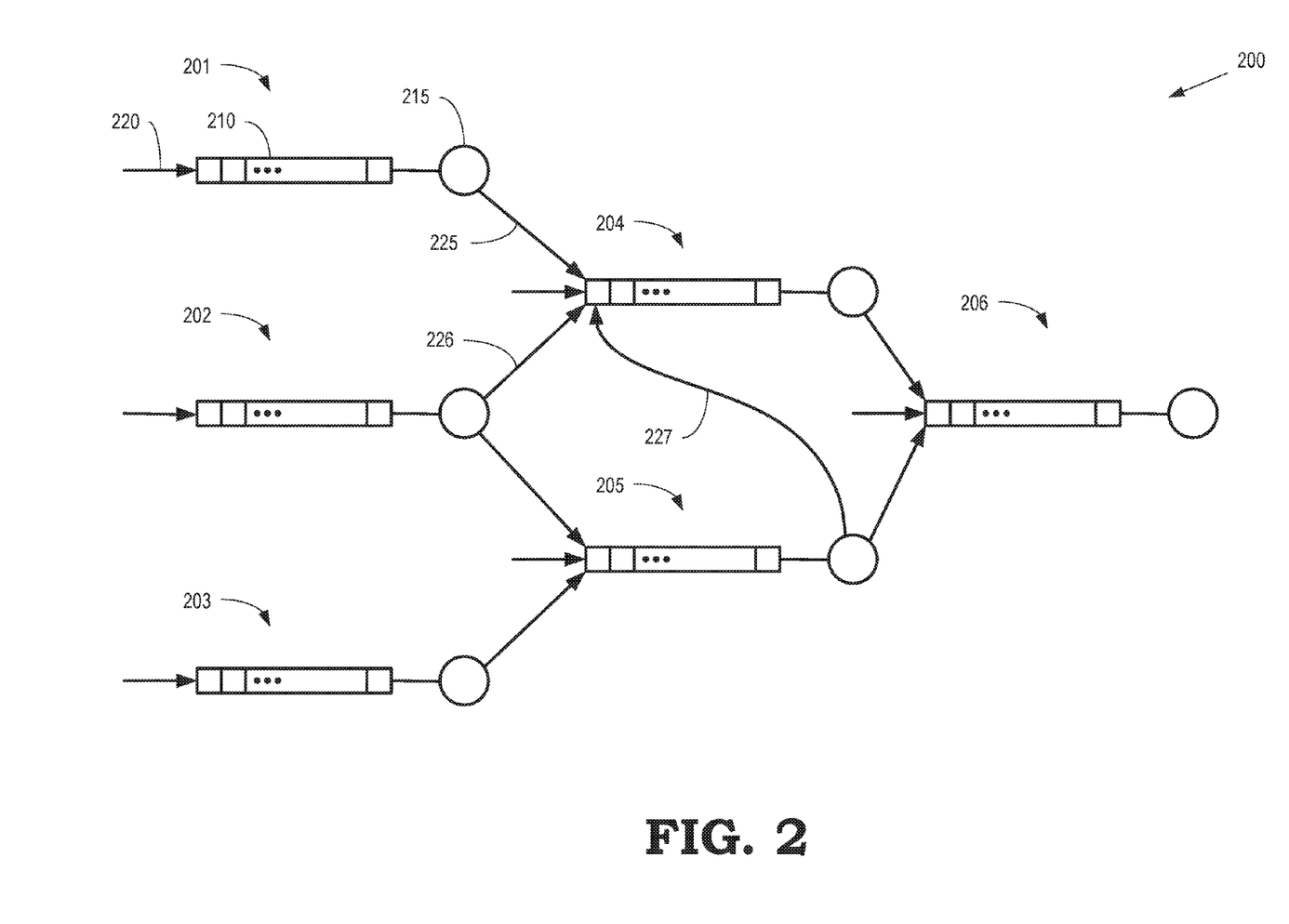
FIG. 2 is an illustration of a queuing network t an SOC according to some embodiments.

FIG. 2 is an illustration of a queuing network 200 that represents an SOC according to some embodiments. The queuing network 200 includes a plurality of nodes 201, 202, 203, 204, 205, 206 (collectively referred to herein as "the nodes 201-206") that represent instruction processors that are configured to process instructions provided to the nodes 201-206. The queuing network 200 may be used to represent some embodiments of the SOC 105 shown in FIG. 1. For example, the nodes 201-206 may represent the CPUs 110-112, the GPUs 115, 116, and the encoder 125 shown in FIG. 1. Each of the nodes 201-206 includes a queue 210 to store instructions and a server 215 that retrieves instructions from the queue 210 and executes the instructions. In the interest of clarity, only the queue 210 and the server 215 associated with the node 201 are indicated by separate reference numerals. The arrival rate of instructions at the queue 210 or the service rate of instructions by the server 215 may be determined based on performance counters associated with the nodes 201, such as the set of performance counters 151 associated with the CPU 110 shown in FIG. 1.

The nodes 201-206 may receive instructions that are scheduled for execution by the instruction processor represented by the nodes 201-206. For example, a scheduler such as the scheduler 150 shown in FIG. 1 may dispatch instructions to the queue 210 of the node 201 for execution by the server 215, as indicated by the arrow 220. The nodes 201-206 are interconnected, e.g., by buses, wires, lines, or traces (not shown in FIG. 2 in the interest of clarity), so that the nodes 201-206 can transmit instructions to each other. The nodes 201-206 may therefore receive instructions from other nodes 201-206. For example, the node 204 may receive instructions from the node 201 as indicated by the arrow 225, the node 202 as indicated by the arrow 226, and the node 205 as indicated by the arrow 227. The arrival rate of instructions at the nodes 201-206 is therefore determined (at least in part) by the service rates of the other nodes 201-206.

Parameters that characterize the length of (or number of instructions waiting in) the queues in the nodes 201-206 may be estimated on the basis of queuing theory, which is the mathematical study of waiting lines or queues of customers waiting to receive a service. For example, given the arrival rate (mean number of arrivals per unit time) of instructions at the nodes 201-206 and the service rate (mean number of instructions executed per unit time) of instructions at the nodes 201-206, a queuing model may be used to estimate parameters including the average queue length, the average waiting time for incoming requests, the server throughput, and the server utilization. The queuing model may also be used to estimate the arrival rates and service rates for steady state operation of the queuing network 200. For example, the mean service time of the server 215 should be less than the mean inter-arrival time of instructions that the corresponding queue 210 for stable operation of the nodes 201. Otherwise, the queue 210 can reach an unsteady state such as overflow. Some embodiments of the queues in the nodes 201-206 may be implemented in memory such as the internal memory 130 or the external memory 140 shown in FIG. 1. The memories 130, 140 may be sufficiently large to hold all instructions queued for the nodes 201-206 so that no instructions are lost due to overflow. However, overflow may indicate that service rate of one or more of the nodes 201-206 is high enough to increase the arrival rate at another one of the nodes 201-206 above the value needed for the steady-state. One or more of the nodes 201-206 may therefore be operating at a voltage or frequency that is unnecessarily high, thereby wasting power.

The queuing model of the queuing network 200 can be constructed by modeling the arrival rates and the service rates of the nodes 201-206. The service rates are estimated as the amount of time taken by the nodes 201-206 to process incoming requests (e.g., by executing the instructions indicated in the requests) and the arrival rates are estimated based on the rate at which requests are received at the nodes 201-206 by their dependent instruction processors. The service rate of a node is primarily dependent on two factors: (1) the operating state (voltage, frequency, number of cores) of the node and (2) workload parameters such as instruction level parallelism (ILP) of a CPU or thread level parallelism (TLP) have a GPU. For example, when processing a graphics kernel, the service rate of a GPU increases with higher frequency and higher TLP. For another example, when processing an instruction stream, the service rate of a CPU increases with higher frequency and higher ILP. The performance counters for the nodes 201-206 can be used to configure the queuing model to indicate the service rates for the nodes 201-206 as a function of the workload parameters and the operating states of the nodes 201-206. Arrival rates for the nodes 201-206 can be approximated by monitoring performance counters that indicate the rate of data transfer between nodes 201-206.

The queuing model is used to determine operating points of the nodes 201-206 that represent the SOC. For example, an SMU such as the SMU 160 shown in FIG. 1 may use the queuing model to determine the operating points of the instruction processors represented by the nodes 201-206. The operating points may be determined based on a global metric under the constraint that the queues associated with the nodes 201-206 remain in steady state. A global metric may indicate one or more of overall utilization of the SOC, throughput of the SOC, throughput of one or more of the plurality of instruction processors in the SOC, instructions per watt of power consumed by the SOC, and a total die power of the SOC. Some embodiments of the queuing model of the queuing network 200 are represented as a Jackson network, which is a class of queuing network that has a product-form solution that simplifies the calculation of the equilibrium distribution of instructions in the queues associated with the nodes 201-206.

Some embodiments of the queuing model are determined using off-line training. For example, a suite of applications that represent a typical range of applications expected to be executed on the SOC represented by the queuing network 200 may be executed using different values of the operating points of the nodes 201-206. Performance counters associated with the nodes 201-206 may be monitored during execution and correlated with instruction arrival rates, service rates, queue lengths, and other parameters that characterize the state of the nodes 201-206. The collected data may then be used to generate models that estimate operational parameters as a function of values of the performance counters over a range of values of the performance counters. For example, models of the service rates of the nodes 201-206 may be generated as a function of values of a predetermined set of performance counters. The suite of applications may also cover a range of application phases that correspond to different operational states of the nodes 201-206. For example, in a first phase, the node 205 may generate instructions for the node 204, as indicated by the arrow 227. However, in a second phase, the node 205 may not generate instructions for the node 204. Different models or different model parameters may then be applied depending on the operational states of the nodes 201-206 corresponding to the different application phases.

Figure 3:
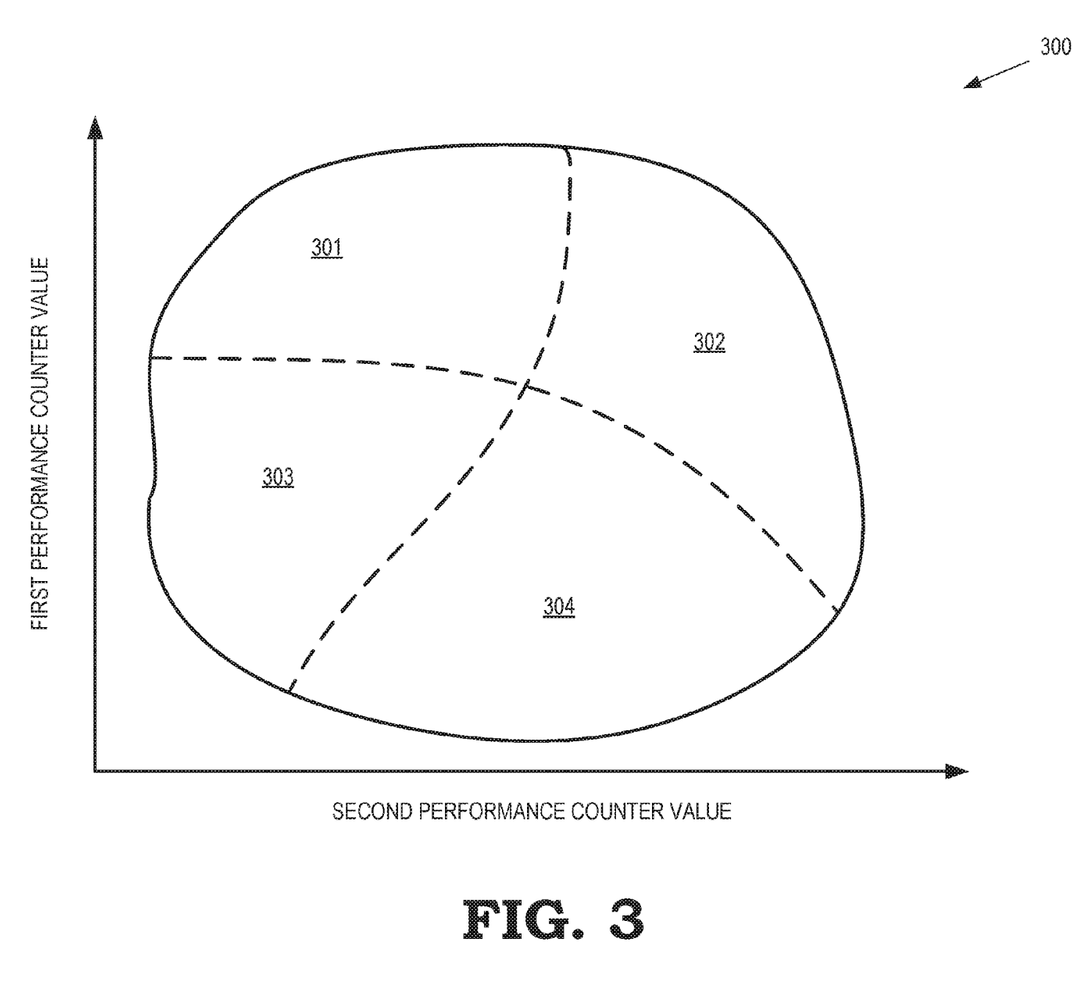
FIG. 3 is an illustration of a phase space that indicates different phases of an application according to some embodiments.

FIG. 3 is an illustration of a phase space 300 that indicates different phases of an application according to some embodiments. The phase space 300 may represent phases of applications running on an SOC such as the SOC 105 shown in FIG. 1. The vertical axis indicates a range of values of a first performance counter and the horizontal axis indicates a range of values of a second performance counter. The first and second performance counters may correspond to two of the performance counters 151-156 shown in FIG. 1. Although the phase space 300 is a function of two performance counters in FIG. 3, some embodiments of the phase space 300 may be a function of any number of performance counters that may be represented by a corresponding number of dimensions in the phase space 300.

The phase of the application is determined based on the values of the first and second performance counters. For example, the application is operating in a first phase 301 when the values of the first and second performance counters indicate the region of the phase space 300 associated with the first phase 301, the application is operating in a second phase 302 when the values of the first and second performance counters indicate the region of the phase space 300 associated with the second phase 302, the application is operating in a third phase 303 when the values of the first and second performance counters indicate the region of the phase space 300 associated with the third phase 303, and the application is operating in a fourth phase 304 when the values of the first and second performance counters indicate the region of the phase space 300 associated with the fourth phase 304.

A model of a queuing network representative of the SOC may change in response to changes in the application phase. For example, a first instruction processor may provide requests to execute instructions to a second processor while the SOC is operating in the first phase 301 and the first instruction processor may provide requests to execute instructions to a third processor while the SOC is operating in the second phase 302. The instruction arrival rates or instruction service rates of the instruction processors in the SOC may also change in response to changes in the application phase. For example, the instruction service rate of the instruction processor may be relatively high while the SOC is operating in the third phase 303, but the instruction service rate of the instruction processor may decrease in response to the SOC transitioning into the fourth phase 304. An SMU such as the SMU 160 shown in FIG. 1 may therefore use different models or different model parameters to control the operating points of the instruction processors in the SOC depending on the phase of the phase space 300 indicated by the performance counter values.

Figure 4:
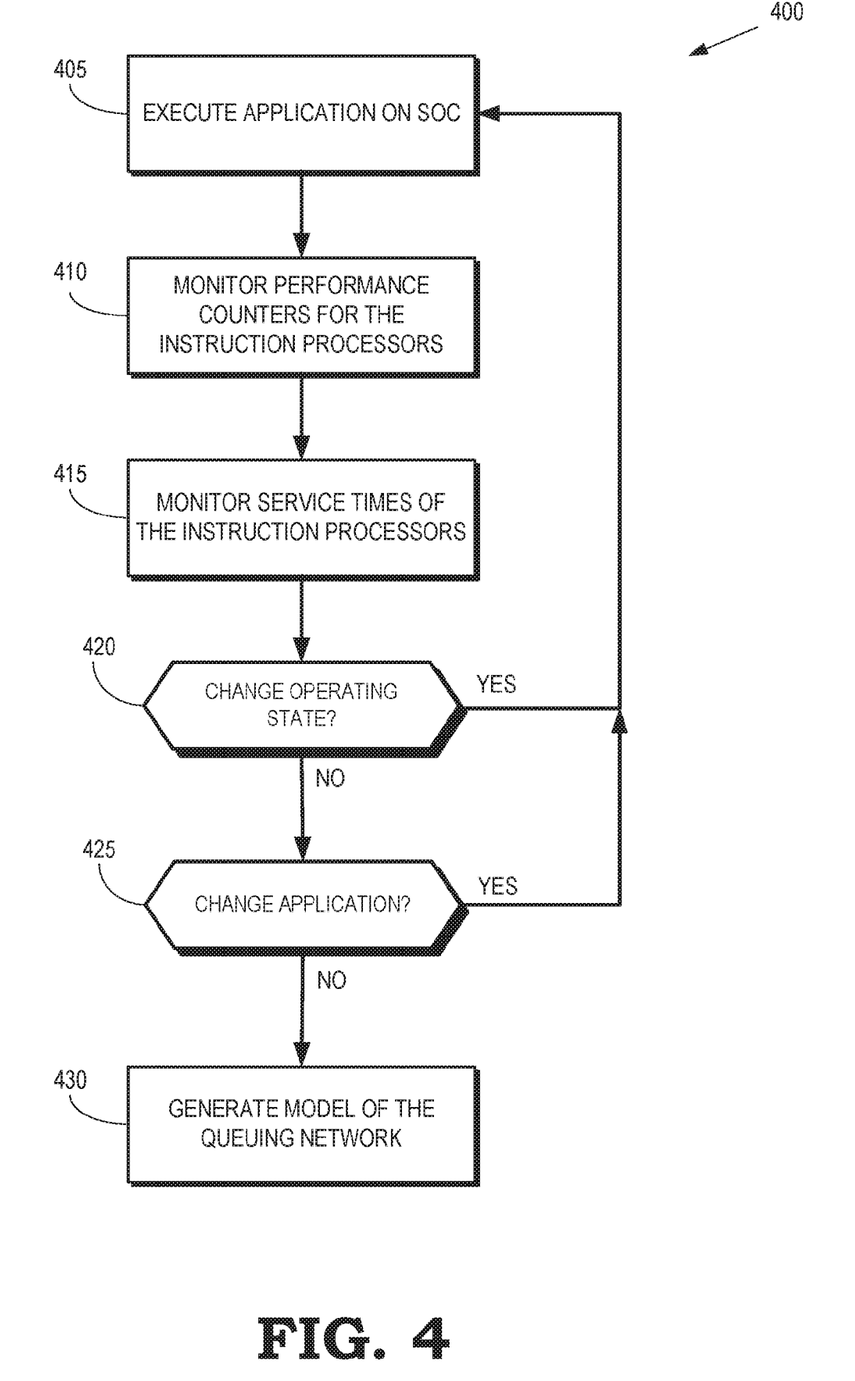
FIG. 4 is a flow diagram of a method for configuring a model of a queuing network according to some embodiments.

FIG. 4 is a flow diagram of a method 400 for configuring a model of a queuing network according to some embodiments. The method 400 may be implemented in some embodiments of the SOC 105 shown in FIG. 1. The method 400 is used to execute a suite of applications on the SOC and configure the model prior to runtime for other applications.

At block 405, the SOC executes an application using instruction processors that are configured to operate at corresponding operating points. At block 410, the SOC monitors performance counters associated with the instruction processors in the SOC concurrently with the SOC executing the application. At block 415, the SOC monitors service times of the instruction processors concurrently with the SOC executing the application. The monitoring information may then be stored, e.g., in a memory such as the internal memory 130 or the external memory 140 shown in FIG. 1.

At decision block 420, the SOC determines whether to execute the application at a different set of operating points for the instruction processors. If so, the operating points are modified and the method 400 flows to block 405 to execute the application at the new operating point. Once the application has been executed in a complete set of operating points, the method flows to decision block 425 and the SOC determines whether there are additional applications in the suite of applications for execution on the SOC. If so, a new application is selected and the method 400 flows to block 405 to execute the new application. The operating points of the instruction processor systems may also be reset to their initial states prior to executing the new application. Once the SOC has completed executing the suite of applications using the set of operating points, the method 400 flows to block 430.

At block 430, the SOC generates a model of the queuing network. Some embodiments of the model include information identifying arrival rates or service rates of the instruction processors as a function of values of the performance counters and the operating points of the instruction processors. The model may also indicate other parameters such as a battery life, power efficiency, power consumption, and the like, which may be indicated as a function of the values of the performance counters and the operating points of the instruction processors. The model may also indicate different application phases that correspond to different applications or different operating points of the applications.

Figure 5:
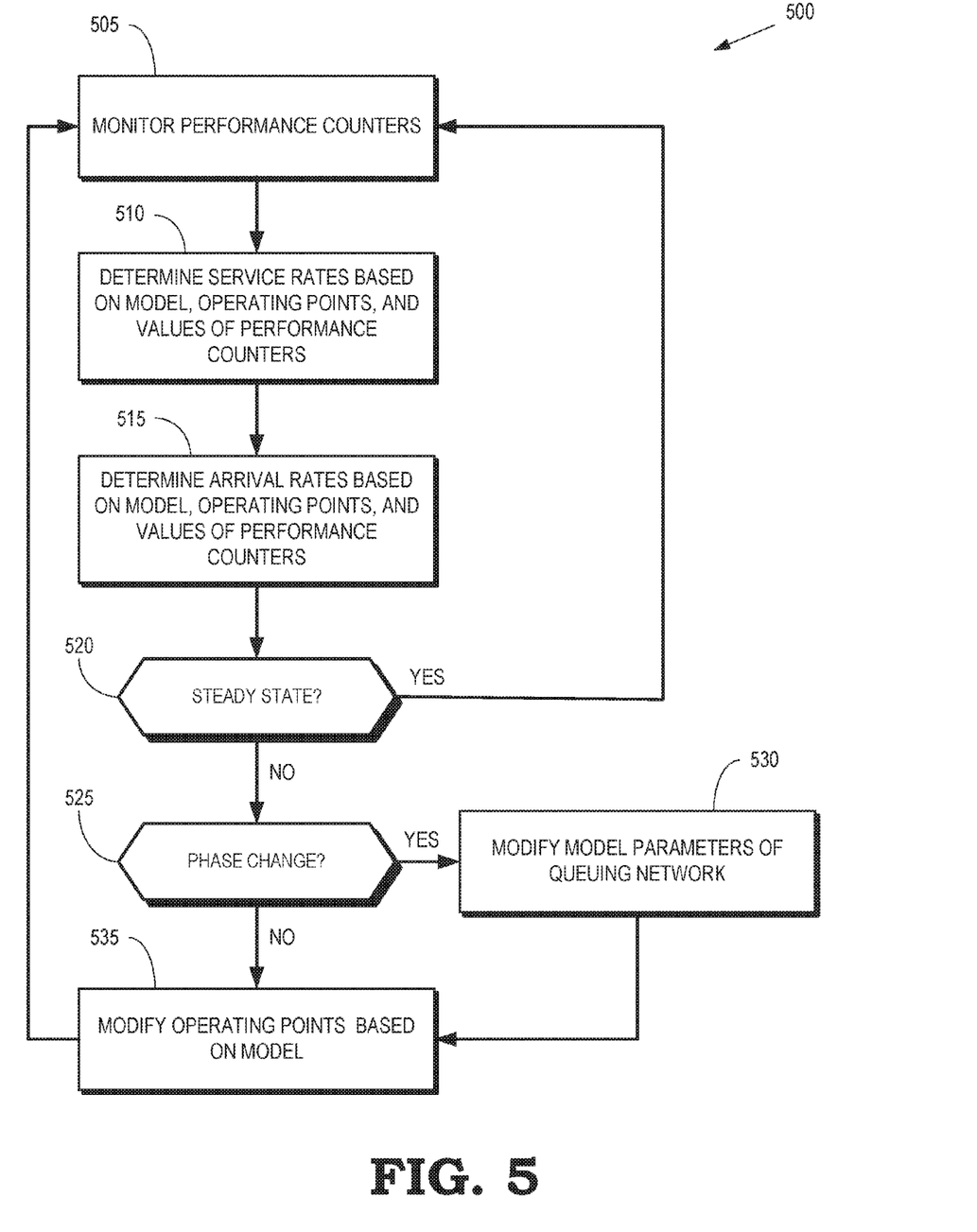
FIG. 5 is a flow diagram of a method for determining operating points of instruction processors in an SOC that is represented by a queuing network according to some embodiments.

FIG. 5 is a flow diagram of a method 500 for determining operating points of instruction processors in an SOC that is represented by a queuing network according to some embodiments. The method 500 may be implemented in some embodiments of the SOC 105 shown in FIG. 1 and may represent some embodiments of the queuing network 200 shown in FIG. 2. The method 500 can modify the operating points using a model of the queuing network, such as the model configured according to the method 400 shown in FIG. 4.

At block 505, an SMU such as the SMU 160 shown in FIG. 1 monitors performance counters associated with the instruction processors in the SOC. The SMU monitors the performance counters concurrently with execution of one or more applications by the instruction processors. The instruction processors are operating at initial operating points, which may be configured by the SMU or may be default values. At block 510, the SMU determines service rates for the instruction processors based on the model, the operating points of the instruction processors, and the monitored values of the performance counters. At block 515, the SMU determines arrival rates for the instruction processors based on the model, the operating points of the instruction processors, and the monitored values of the performance counters. For example, the arrival rate for each (consumer) instruction processor may be equal to the sum of the service rates of the (producer) instruction processors that generate instructions that are provided to the consumer instruction processor. The arrival rate for the consumer instruction processor may also include instructions that are scheduled for processing by the consumer instruction processor. In some cases, not all of the instructions serviced by the producer instruction processors result in a request to executing an instruction at the consumer instruction processor, which can be accounted for by the SMU.

At decision block 520, the SMU determines whether the instruction processors in the queuing network are in a steady-state that is indicated by a balance between the instruction arrival rates and service rates for the instruction processors. For example, if the queuing network only includes a single producer instruction processor (such as a CPU) and a single consumer instruction processor (such as a GPU), the queuing network may be in a steady-state if the instruction service rate at the CPU (which is equal to the instruction arrival rate at the GPU in this example) is equal to the instruction service rate at the GPU. A CPU service rate that is larger than the GPU service rate results in a non-steady-state in which the queue length at the GPU is increasing. A CPU service rate that is smaller than the GPU service rate results in a non-steady-state in which the queue length at the GPU is decreasing. In the first scenario, the CPU may be wasting energy by operating at an operating point that is too high and, in the second scenario, the GPU may be wasting energy by operating at an operating point that is too high. Alternatively, in the first scenario, performance of the SOC may be improved by increasing the operating point of the GPU and, in the second scenario, performance of the SOC may be improved by increasing the operating point of the CPU.

If the instruction processors in the queuing network are in the steady-state, the method 500 flows to block 505 and continues to monitor the performance counters and determine the service and arrival rates. If the instruction processors in the queuing network are not in the steady-state, the method 500 flows to decision block 525.

At block 525, the SMU determines whether an application phase change has occurred. If so, the SMU modifies (at block 530) the model parameters of the queuing network to reflect the phase change and then the method 500 flows to the block 535. If the SMU does not detect an application phase change, the method 500 flows directly to the block 535.

At block 535, the SMU modifies operating points of one or more of the instruction processors based on the model of the queuing network. As discussed herein, the SMU modifies the operating points based on a global metric to reach steady-state operation of the queuing network. Global metrics may include metrics related to power consumption or performance of the SOC. For example, if the queuing network that represents the SOC including a single producer CPU and a single consumer GPU is not in the steady-state because the CPU service rate is larger than the GPU service rate, the SMU may decrease the operating point of the CPU to conserve power and achieve steady-state operation. Alternatively, the SMU may increase the operating point of the CPU to improve performance and achieve steady-state operation. For another example, if the queuing network that represents the SOC is not in the steady-state because the CPU service rate is smaller than the GPU service rate, the SMU may decrease the operating point of the GPU to conserve power and achieve steady-state operation. Alternatively, the SMU may increase the operating point of the GPU to improve performance and achieve steady-state operation. Modification of the operating points may be determined using a Jackson network model, as discussed herein. Once the operating points have been modified, the method 500 flows to block 505.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   determining instruction arrival rates for a plurality of instruction processors implemented on a system-on-a-chip (SOC) based on values of performance counters associated with the plurality of instruction processors, the performance counters estimating the instruction arrival rates;
   determining, based on the performance counters, current phases of operation for the plurality of instruction processors;
   determining instruction service rates for the plurality of instruction processors based on models of the instruction service rates as a function of operating points of the plurality of instruction processors, a model for each phase of operation of the plurality of instruction processors, each phase having a different dependency relationship among the instruction processors that describes which instruction processors send instructions to other instruction processors;
   determining, based on the current phases of operation and the models of the instruction service rates, current operating points for the instruction processors; and modifying at least one operating point of at least one of the plurality of instruction processors based on comparisons of the instruction arrival rates and the instruction service rates.

2. The method of claim 1, further comprising:
executing the applications using the plurality of instruction processors at a plurality of different operating points;
monitoring values of the performance counters concurrently with executing the applications; and
configuring the models of the instruction service rates based on the plurality of different operating points of the plurality of instruction processors and the monitored values of the performance counters.

3. The method of claim 2, further comprising:
modifying the models in response to detecting a phase change in instructions being executed by the plurality of instruction processors.

4. The method of claim 1, wherein determining the instruction arrival rate for a particular instruction processor of the plurality of instruction processors comprises determining the instruction arrival rate based on at least one instruction service rate of at least one other instruction processor of the plurality of instruction processors that provides instructions to the particular instruction processor.

5. The method of claim 4, wherein modifying the at least one operating point of the at least one of the plurality of instruction processors comprises increasing an operating point of the particular instruction processor in response to the instruction arrival rate being greater than the instruction service rate of the particular processor.

6. The method of claim 4, wherein modifying the at least one operating point of the at least one of the plurality of instruction processors comprises decreasing an operating point of the particular instruction processor in response to the instruction arrival rate being less than the instruction service rate of the particular processor.

7. The method of claim 1, wherein:
the current operating points are for steady state processing by the instruction processors indicated by a balance between the instruction arrival rates and the instruction service rates for the plurality of instruction processors;
the models of the instruction service rates are determined by executing applications on the plurality of instruction processors prior to runtime; and
modifying the at least one operating point of the at least one of the plurality of instruction processors comprises modifying the at least one operating point to achieve a global metric.

8. The method of claim 7, wherein the global metric indicates at least one of overall utilization of the SOC, throughput of the SOC, throughput of one or more of the plurality of instruction processors, instructions per watt of power consumed by the SOC, and a total die power of the SOC.

9. A system-on-a-chip (SOC) comprising:
a plurality of instruction processors; and
a hardware block configured to access:
models of instruction service rates as a function of operating points of the plurality of instruction processors and values of performance counters associated with the plurality of instruction processors;
a plurality of phases of operation of the plurality of instruction processors, each phase having a different dependency relationship among the instruction processors that describes which instruction processors send instructions to other instruction processors; and
values of performance counters associated with the plurality of instruction processors and usable to modify at least one operating point of at least one of the plurality of instruction processors based on:
comparisons of the instruction arrival rates and the instruction service rates;
a determination of a current phase of operation from the plurality of phases of operation; and
a determination, based on the current phase of operation and the models of instruction service rates, of current operating points for steady state processing by the plurality of instruction processors.

10. The SOC of claim 9, wherein:
the plurality of instruction processors are configured to execute the applications at a plurality of different operating points prior to runtime for steady state processing of instructions by the plurality of instruction processors, steady state indicated by a balance between instruction arrival rates and the instruction service rates for the plurality of instruction processors; and
a system management unit is to monitor values of the performance counters concurrently with executing the applications and configure the models of the instruction service rates based on the plurality of different operating points and the monitored values of the performance counters.

11. The SOC of claim 9, wherein the hardware block is to modify the models in response to detecting a phase change in instructions being executed by the plurality of instruction processors.

12. The SOC of claim 9, wherein the hardware block is to determine the instruction arrival rate for a particular instruction processor of the plurality of instruction processors based on at least one instruction service rate of at least one other instruction processor of the plurality of instruction processors that provides instructions to the particular instruction processor.

13. The SOC of claim 12, wherein the hardware block is to increase an operating point of the particular instruction processor in response to the instruction arrival rate being greater than the instruction service rate of the particular processor.

14. The SOC of claim 12, wherein the hardware block is to decrease an operating point of the particular instruction processor in response to the instruction arrival rate being less than the instruction service rate of the particular processor.

15. The SOC of claim 9, wherein the hardware block is to modify the at least one operating point to achieve a global metric.

16. The SOC of claim 15, wherein the global metric indicates at least one of overall utilization of the SOC, throughput of the SOC, throughput of one or more of the plurality of instruction processors, instructions per watt of power consumed by the SOC, and a total die power of the SOC.

17. A non-transitory computer readable medium embodying a set of executable instructions, the set of executable instructions to manipulate at least one processor to:
determine instruction arrival rates for a plurality of instruction processors implemented on a system-on-a-chip (SOC) based on values of performance counters associated with the plurality of instruction processors, the performance counters estimating the instruction arrival rates;

determine, based on the performance counters, current phases of operation for the plurality of instruction processors;

determine instruction service rates for the plurality of instruction processors based on models of the instruction service rates as a function of operating points of the plurality of instruction processors, a model for each phase of operation of the plurality of instruction processors, each phase having a different dependency relationship among the instruction processors that describes which instruction processors send instructions to other instruction processors;

determine, based on the current phases of operation and the models of the instruction service rates, current operating points for the instruction processors; and modify at least one operating point of at least one of the plurality of instruction processors based on comparisons of the instruction arrival rates and the instruction service rates.

18. The non-transitory computer readable medium of claim 17, wherein the processor is to:

execute applications using the plurality of instruction processors at a plurality of different operating points;

monitor values of the performance counters concurrently with executing the applications; and configure the models of the instruction service rates based on the plurality of different operating points of the plurality of instruction processors and the monitored values of the performance counters.

19. The method of claim 1, wherein:

the instruction processors are interconnected with each other in a queuing network; and modifying at least one operating point of at least one of the plurality of instruction processors includes modifying thread level parallelism of at least one of the plurality of instruction processors.

20. The method of claim 1, wherein:

determining the current operating points for the instruction processors includes: identifying current models of relationships among the plurality of instruction processors for the current operating points; and modifying the at least one operating point is based on the identified current models of relationships among the instruction processors.

* * * * *